United States Patent [19]

Morchand et al.

[11] 3,752,911

[45] Aug. 14, 1973

[54] HIGH RESOLUTION TELEVISION TRANSMISSION

[75] Inventors: Charles A. Morchand, New York; Don J. Dudley, Brightwaters, both of N.Y.

[73] Assignee: Data-Plex Systems, Inc., New York, N.Y.

[22] Filed: June 18, 1971

[21] Appl. No.: 154,406

[52] U.S. Cl. ........ 178/6.8, 178/DIG. 3, 178/DIG. 23

[51] Int. Cl. ........ H04n 7/08

[58] Field of Search ........ 178/DIG. 23, 6.8, 178/DIG. 3, DIG. 2

[56] References Cited

UNITED STATES PATENTS

| | | | |
|---|---|---|---|
| 3,294,903 | 12/1966 | Goldmark | 178/DIG. 2 |
| 2,527,967 | 10/1950 | Schrader | 178/DIG. 23 |
| 3,061,670 | 10/1962 | Oster et al. | 178/DIG. 3 |
| 3,456,071 | 7/1969 | Jackson et al. | 178/DIG. 23 |
| 2,219,149 | 10/1940 | Goldsmith | 178/DIG. 23 |

*Primary Examiner*—Howard W. Britton
*Attorney*—Frederick E. Hane et al.

[57] ABSTRACT

A high-resolution television picture is generated. Portions of the picture are then transmitted as low-resolution pictures. The low-resolution pictures are received and assembled to reform the high-resolution picture.

7 Claims, 5 Drawing Figures

TRANSMIT TERMINAL

INVENTORS
CHARLES A. MORCHAND
DON J. DUDLEY
BY Hane, Baxley and Spiecens
ATTORNEYS INVENTORS
CHARLES A. MORCHAND
DON J. DUDLEY
BY Hane, Baxley and Spiecens
ATTORNEYS INVENTORS
CHARLES A. MORCHAND
DON J. DUDLEY
BY Hane, Baxley and Spiecens
ATTORNEYS

HIGH RESOLUTION TELEVISION TRANSMISSION

This invention pertains to television transmission systems and more particularly to such systems wherein high-resolution television pictures are transmitted over limited bandwidth video channels.

Generally, conventional broadcast television operates in a system having 525 lines per frame with a bandwidth of 4 to 5 megahertz. While such systems give adequate picture transmission for general entertainment broadcasting, the picture resolution is too low for transmitting pictures having fine detail such as charts and maps, for example. Such pictures require high-resolution of say, at least 1,000 lines per frame, and a video bandwidth of 10–15 magahertz. While the obvious solution to the problem is to use special wide-band systems, such a solution is expensive. Since there exists an almost universal network of low-resolution transmission equipment and channels it is economically advantageous to exploit these existing facilities.

Accordingly, it is a general object of the invention to provide for the transmission of high-resolution television pictures over low-resolution channels.

Briefly, the invention contemplates the generation of a high-resolution television picture, the sequential selection and transmission of different portions of the high-resolution picture as low resolution pictures and the reception and assembling of the low-resolution pictures for display as a high-resolution picture.

In order to further exploit the presently available transmission channels, the invention further contemplates interspersing fields of the low-resolution pictures in the stream of transmission of fields of general broadcast information. (In the application the term "fields" will be used. However, such word is intended to also encompass frames as the unit for a television picture.)

Other objects, advantages and features of the invention will be apparent from the following detailed description of the invention when read with the accompanying drawing which shows a television transmission system in accordance with the invention.

Figure 1:
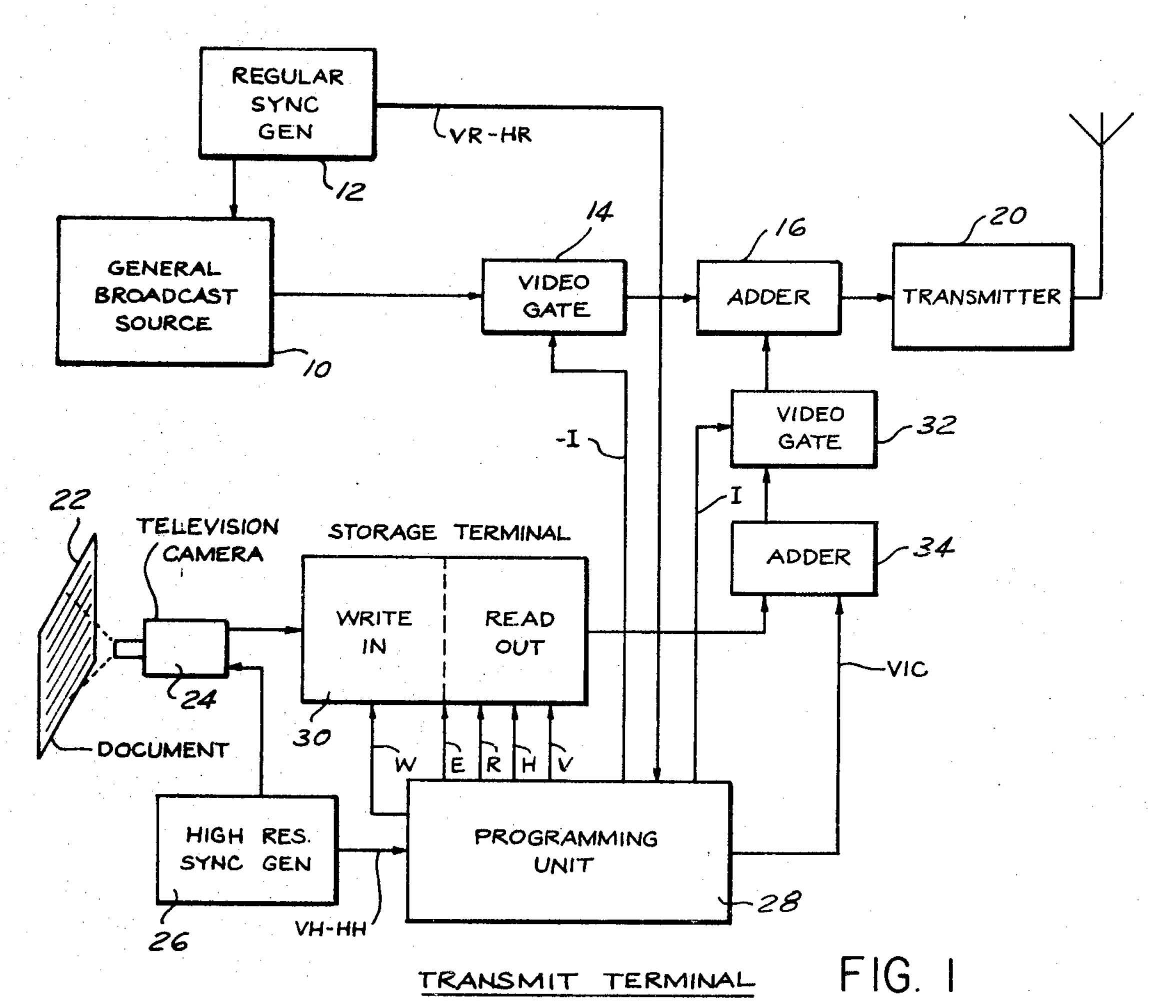
FIG. 1 is a block diagram of the transmit terminal of the system.

The transmit terminal will now be described utilizing FIGS. 1 and 2. Normally, a general broadcast source 10 such as a television camera transmits fields of an entertainment program under synchronization control of regular sync generator 12. Generator 12 is conventional and generates the sync pulses such as the vertical and horizontal sync pulses associated with 525 lines system. The fields from source 10 pass through open video gate 14 to one input of adder 16. Adder 16 can be a conventional analog adder which transmits the instantaneous voltage or current sum of the signals present at its two inputs. As will hereinafter become apparent, there is a signal at only one input at a time. Thus, adder 16 performs an OR-function. The output of adder 16 is connected to one input of conventional transmitter 20 which broadcasts the television fields.

Now the system wishes to "piggyback" the transmission of a high-resolution still picture onto the transmission of the general broadcast frames. The picture can be document 22 which is "read" by television camera 24 which can be a high-resolution camera such as a Cohn Model 6600 under control of sync pulses from high-resolution sync generator 26 which can be similar to sync generator 12 except that it generates 1,225 line/frame sync pulses.

Under control of programming unit 28, hereinafter more fully described, one field from camera 24 is read into storage terminal 30 which can be a Princeton Electronic Products 400 video storage terminal. This storage terminal utilizes a "Lithicon" tube. In such a case the field from camera 24 is written onto the target of the tube. (See FIG. 2A for the format of the target). The target is conceptually divided into quadrants. In practice, this is accomplished by generating a read out scan raster which has one-half the height and one-half the width of the write in scan raster. (It is only necessary to use horizontal and vertical sweep signals that are one-half the usual amplitude.) The scan raster must be positioned to each different quadrant which is easily accomplished by adding appropriate DC centering signals to the sweep signals. This read out scan raster, however, is generated by the regular sync pulses associated with the entertainment program to provide a low-resolution field for each read out quadrant.

In operation, programming unit 28 will generate a signal indicating that a quadrant of the stored picture is to be transmitted. The next occurring regular V- sync pulse (VR-SYNC) causes programming unit 28 to emit signals on lines I and –I which blocks video gate 14 and opens video gate 32 respectively, and these gates remain in this state until the next regular V- sync pulse. In the vertical blanking of this field interval programming unit 28 transmits a particular quadrant identifying signal on line VIC to adder 34 (similar to adder 16). At the same time V and H signals from programming unit 28 cause terminal 30 to read out the first quadrant, as shown in FIG. 2B, to adder 34. The output of adder 32 is connected via now open video gate 32 to the second input of adder 16. Since video gate 14 is blocked the only signals now transmitted from adder 16 to transmitter 20 are the signals of the field representing the first quadrant of the high-resolution picture. At the end of the field (the next regular VR-SYNC pulse) gate 32 is blocked and gate 14 opens. Thus, one quadrant of the high-resolution picture has been substituted for a field of the general broadcast program. Sometime thereafter, programming unit 28 generates a signal calling for another substitution. The operation is identical as described above except the DC components of the signals on lines V and H are changed to select the second quadrant and a different code is transmitted on line VIC associated with the second quadrant. After four such substitutions, programming unit 28 transmits in sequence E and W signals to terminal 30 to erase the stored picture and permit the writing in of a new picture.

The programming unit 28 is centered around the program counter 40 which is a four stage step counter which is stepped by signals on the line I. The signals on line I are generated by flip-flop 42 and last for one regular field time. In particular, whenever a quadrant is to be transmitted, line C is pulsed from a source not shown. This source can be from a switch operated by a program director or from a periodic pulse source. Line C is connected to one input of AND-gate 44 whose other input receives a VR-SYNC pulse from regular sync generator 12 (FIG. 1). At the coincidence of these two pulses AND-gate 44 transmits a pulse to the set terminal of flip-flop 42 which sets and starts generating the signal of line I. At the next occurring VR-SYNC pulse, a pulse passes through AND-gate 46 to reset the flip-flop. Note the inputs of AND-gate 46 are connected to the VR-SYNC and I signal lines. Thus, each time line C is pulsed, counter 40 steps one position. Since the counter 40 steps modulo-4 every fourth pulse on line C steps the counter from the fourth to the first position. During this transition the fourth stage of the counter triggers one-shot 48 which emits a pulse of sufficient duration to erase the field stored in storage terminal 30. The trailing edge of this pulse triggers one-shot 50 which generates a pulse on line W of sufficient duration for storage terminal 30 (FIG. 1) to write in a new field. (The E and W signals which are fed to storage terminal 30 control the erase and write cycles thereof.) The read out cycles are controlled by a signal on line R fed to terminal 30. Line R is connected to the output of AND-gate 52 whose three inputs are connected to the -W, -E and I signal lines. Thus, one of the four quadrants is controlled to be read out each time a pulse is received from line C, and a specific quadrant is associated with each stage or state of counter 40.

Each quadrant as it is being read out is identified by from one to four pulses in its vertical blanking interval. These pulse codes are generated by the circuitry centered around four-input OR-circuit 54 whose output is connected via line VIC to adder 34 (FIG. 1). Each input of OR-circuit 54 is connected to an output of one of the one-shots 56, 58, 60 and 62 arranged in cascade in that order. Each of the one-shots except one-shot 56 has two inputs either of which can trigger the one-shot to emit one pulse. Included in the cascade input of each of the one-shots is means for delaying its triggering for a fraction of a pulse time. The only input of one-shot 56 is connected to stage 4 of counter 40. The second inputs (non-cascade or those not connected to the output of a previous one-shot) of one-shots 58, 60 and 62 are connected to the outputs of stages 3, 2 and 1, respectively, of counter 40. Thus, when counter 40 is on stage 4, OR-circuit 54 emits 4 sequential pulses indicating the fourth quadrant, when on stage 3, three pulses, etc.

The actual selection of a particular quadrant in storage terminal 30 is accomplished by generating raster scanning signals which are fed via the V and H lines, respectively, to the vertical and horizontal amplifiers of terminal 30. These signals are generated by the deflection circuitry 61. The vertical sweep signals are generated by sweep circuit 68 which generates one vertical sweep signal each time it is triggered by a VR-SYNC pulse. However, this signal is fed to adder 64 only during a read cycle by virtue of gate 70 which connects the output of sweep circuit 68 to input of adder 64, gate 70 being controlled by the signal on line R. Vertical centering to the top or bottom half of the target is controlled by a DC signal fed via gate 77, during the presence of the R signal, to the second input of the adder 64 from the output of amplifier 72 whose inputs are connected to the output of OR-circuit 74. The two inputs of OR-circuit 74 are connected to the outputs of the first and second stages of the counter 40. Thus, when the counter is in either the first or second state amplifier 72 emits a DC signal to ensure that the scans are in the top half of the target (FIG. 2B and 2C). For states 3 and 4, the DC signal is not present or negative and the bottom half will be scanned. In a similar manner, gate 76 controls the passage of horizontal sweep signals from sweep circuit 78 (triggered by HR-SYNC pulses) to an input of adder 66; and left/right centering is determined by amplifier 78 driven by OR-circuit 80 whose inputs are connected to stages 2 and 3 of counter 40. Gate 79, under control of the R signal, limits the adding of the horizontal DC signal to the reading mode.

During the writing mode gates 82 and 84 are open because of the presence of the W signal at their control inputs. Accordingly, the output of sweep circuits are fed to lines V and H, respectively. The HR-SYNC and HH-SYNC pulse from high-resolution sweep generator 26 (FIG. 1) are fed to trigger inputs of sweep circuits 86 and 88, respectively.

Figure 2:
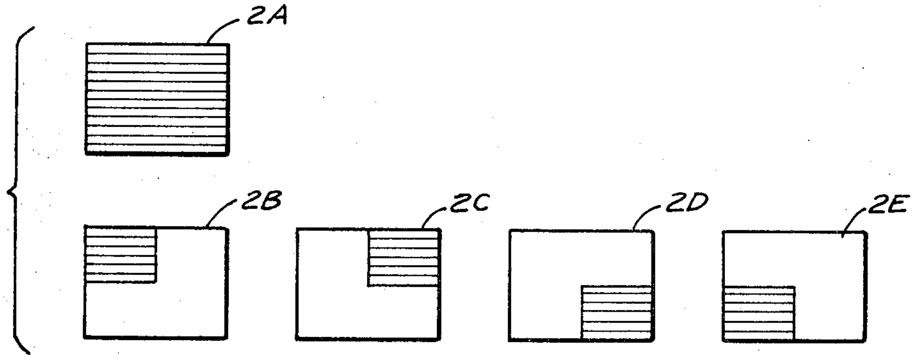
FIG. 2 shows pictures of various fields of the television picture to be transmitted.
Figure 4:
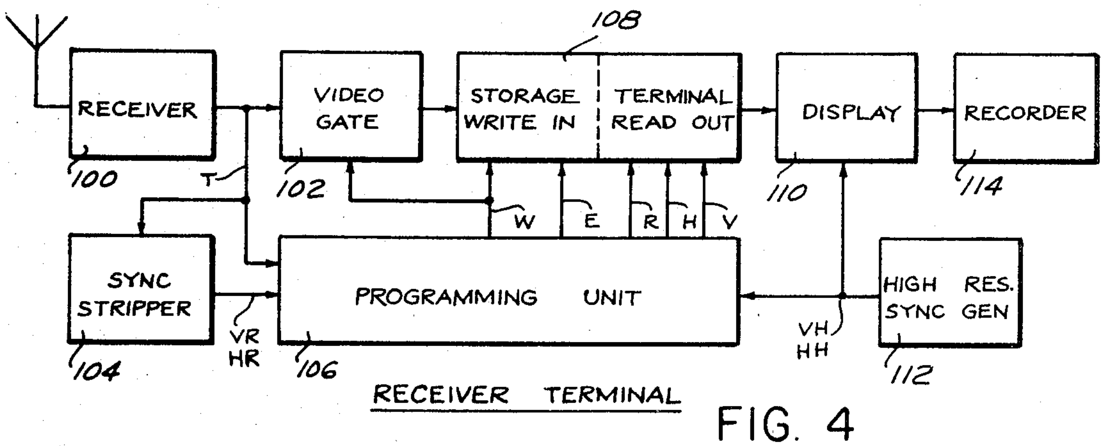
FIG. 4 is a block diagram of the receive terminal of the system.
Figure 5:
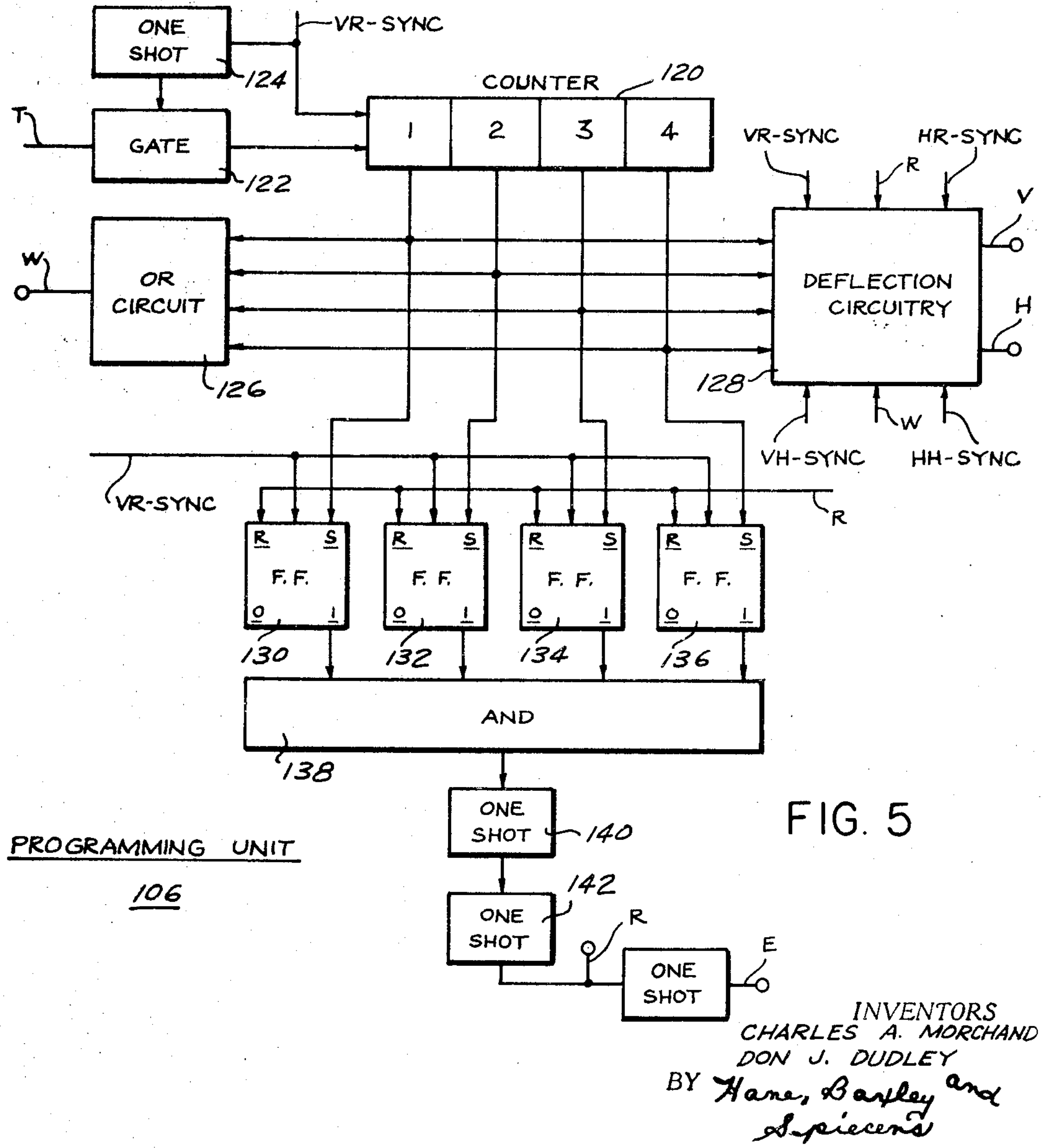
FIG. 5 is a block diagram of the programming unit of the receive terminal of FIG. 4.

The receive terminal shown in FIG. 4 performs the inverse function of the transmit terminal of FIG. 1. It receives the four low-resolution fields, each representing a quadrant, assembles them into a single picture and then displays the picture as a high-resolution picture for recording.

The signals from the transmit terminal are received by conventional front-end receiver 100 and are fed via line T to the input of conventional video gate 102, to conventional sync stripper 104 (for removing the V-sync pulses, VR-SYNC, and H-sync pulses, HR-SYNC) and the programming unit 16, hereinafter more fully described.

The output of video gate 102 is connected to the write-in input of storage terminal 108 which is identical with storage terminal 30 of the transmit terminal.

Whenever programming unit 106 receives a quadrant identification code signal it transmits a signal on line W which opens video gate 102 to connect the output of receiver 100 to the write input of storage terminal 108 for one low-resolution field time. At the same time, programming unit 106 transmits a signal on line W to control storage terminal 108 to store the incoming information, and emits the 525 line scanning raster signals on lines H and V to write the then being received low-resolution signal on proper quadrant of the target of the tube. When the four quadrants are written, programming unit 106 emits a signal on line R to control the read out of the contents of the storage terminal 108 to high-resolution display 110 whose raster is controlled by the HH-SYNC and VH-SINC pulses from high-resolution sync generator 112. At the same time, programming unit 106 transmits the high-resolution raster forming signals via the lines V and H to storage terminal 108. Thereafter, programming unit 106 transmits a signal on line E causing terminal 108 to erase the target. The picture displayed by display 110 can be recorded on microfilm or the like by a photographic camera in recorder 114.

Figure 3:
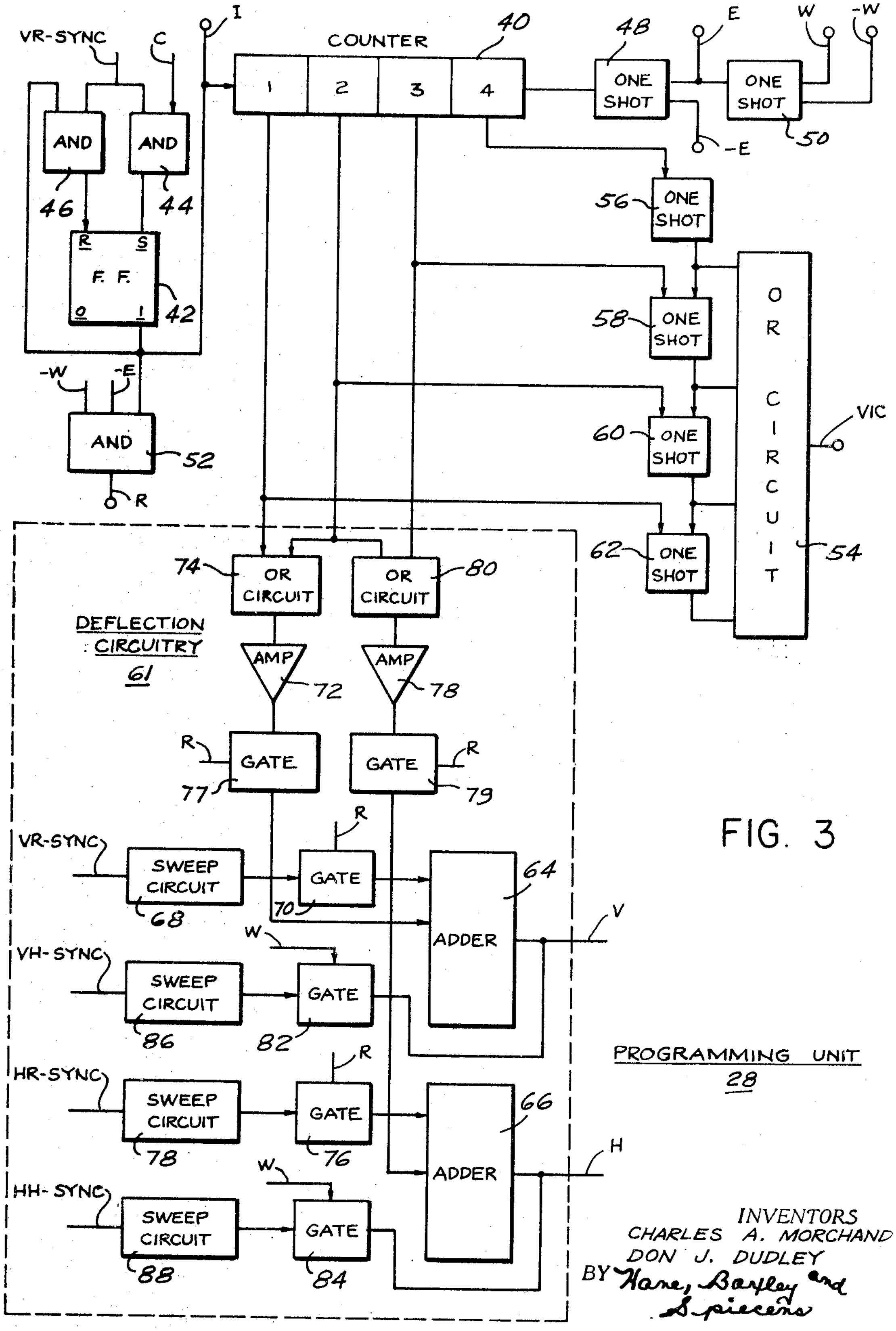
FIG. 3 is a block diagram of the programming unit of the transmit terminal.

The programming unit 106 centers around counter 120, a four stage step counter having a count input connected to gate 122 and a clear input connected to line VR-SYNC from sync stripper 104 (FIG. 4). At the occurrence of each regular (low-resolution) vertical-sync pulse the pulse on line VR-SYNC triggers one-shot 124 to open gate 122 sufficiently long to pass any quadrant identifying pulses which may be present on line T from the receiver 100 (FIG. 4). From one to four of the pulses may be present and counter 120 will be stripped to a corresponding state. Say two pulses are present, then counter 120 will be stepped to state 2 with stage 2 transmitting a signal. At the next occurring VR-SYNC pulse at the start of the next field the counter is cleared. Thus, whenever counter 120 is set one of its stages emits a signal lasting a low-resolution field time. The outputs of all the stages are connected to inputs of OR-circuit whose output is connected via line W to video gate 102 and storage terminal 108. In this way, a low-resolution field enters terminal 108. The actual generation of the particular quadrant raster is the same as with the transmit terminal but by deflection circuitry 128. Deflection circuitry 128 is similar to deflection circuitry 61 of FIG. 3 except that the W and R signals are interchanged since the writing in the receive terminal is a 525 line rate and the reading at the higher rate.

The output of each stage of the counter 120 is connected to the set input of one of the flip-flops 132 to 136 which has a control input for preventing its setting as long as a VR-SYNC pulse is present. Thus, when the fourth of the quadrants has been written, each of the flip-flops will be set. Since the output of each flip-flop is connected to an input of AND-gate 138, this gate will emit a signal when the last flip-flop is set to trigger one-shot 140 acting merely as a time delay. The trailing edge of the signal from one-shot 140 triggers one-shot 142 which generates a signal on line R to define the read out cycle. The trailing edge of the signal from one-shot 142 triggers one-shot 144 which generates a signal on line E to define the erase cycle. The timing of the one-shots is such that the target can be reliably read and erased. Thus, the receive terminal only receives those low-resolution fields that have been identified while the remaining general broadcast fields have been ignored. In addition, the receive terminal assembles the accepted fields into a four quadrant picture which is displayed as a high-resolution picture that can be photographed or otherwise recorded.

While only a four quadrant scheme has been shown, it is possible to obtain higher resolution with greater line density by transmitting, say, sixteen low-resolution fields each representing a different segment of the picture.

What is claimed is:

1. A television transmission system comprising: means for generating a first field of a high-resolution television picture; first storing means for storing said first field and for reading out sequentially different contiguous portions of the stored first field, said first storing means including means for scanning in said first field with a first number of lines, means for selecting in a particular order different contiguous portions of the stored first field for scanning out as fields with a second and lower number of lines, and means reading out by scanning the selected contiguous portions; means for serially emitting each of the read out contiguous portions as a complete field of a low-resolution television picture; means for serially receiving each of said emitted fields; and reassembling means for reassembling the received fields to form a single field having the picture contents of said first field for display as a single complete field.

2. The system of claim 1 further comprising means for generating fields of general broadcast television pictures, means for transmitting the generated fields of general broadcast pictures and the emitted fields associated with the read out contiguous portions with said emitted fields being interspersed in said generated fields, and means for controlling said receiving means to receive only said emitted fields.

3. A television transmission system comprising: means for generating a first field of a high-resolution television picture; first storing means for storing said first field and for reading out sequentially different contiguous portions of the stored first field; means for serially transmitting each of the read out contiguous portions as a complete field of low-resolution television picture; means for serially receiving each of said transmitted fields; and reassembling means for reassembling the received fields to form a single field having the picture content of said first field for display as a single complete field, said reassembling means comprises second storing means for storing each of the serially received fields in a particular order to reassemble the picture content of said first field, and high-resolution display means for displaying the contents of said second storing means.

4. The television transmission system of claim 3 further comprising means for generating and transmitting fields of general broadcast information, and further comprising means for substituting for fields of general broadcast information the fields representing the read out portions, means for identifying the substituted fields and said receiving means including means for transmitting to said second storing means only said substituted fields.

5. The television transmission system of claim 3 wherein said second storing means includes means for scanning in fields with a first number of lines and means for scanning out a field with a second and larger number of lines.

6. The television transmission system of claim 5 wherein said first storing means includes means for scanning in said first field with said second number of lines and means for scanning out fields with said first number of lines.

7. The television transmission system of claim 5 wherein said transmitting means includes means for uniquely identifying each field, and said second storing means includes means for storing each of the uniquely identified fields in a particular position of said second storing means.

* * * * *